United States Patent [19]
Schwarzbich

[11] Patent Number: 5,722,298
[45] Date of Patent: Mar. 3, 1998

[54] ARRESTING SCREW FOR VEHICLE TRANSMISSIONS

[76] Inventor: Jörg Schwarzbich, Wertherstr.15, 33615 Bielefeld, Germany

[21] Appl. No.: 616,887

[22] Filed: Mar. 18, 1996

[30] Foreign Application Priority Data

Mar. 17, 1995 [DE] Germany .................. 195 09 880.3

[51] Int. Cl.$^6$ ........................................ F16H 63/38
[52] U.S. Cl. .................. 74/475; 74/527; 264/248
[58] Field of Search .................. 74/475, 527; 264/248

[56] References Cited

U.S. PATENT DOCUMENTS

| | | |
|---|---|---|
| 4,678,006 | 7/1987 | Northman et al. . |
| 4,796,860 | 1/1989 | Diel ............................... 74/527 |
| 4,941,368 | 7/1990 | De Boer et al. . |
| 4,961,650 | 10/1990 | Schwarzbich ............... 74/475 |
| 5,031,472 | 7/1991 | Dutson et al. ............... 74/475 |
| 5,310,972 | 5/1994 | Spanio ......................... 74/527 |

FOREIGN PATENT DOCUMENTS

| | | |
|---|---|---|
| 2 169 662 | 9/1973 | France . |
| 90 16 977 | 4/1991 | Germany . |
| 36 39 120 | 5/1992 | Germany . |
| 41 41 986 | 6/1993 | Germany . |
| 43 07 596 | 9/1994 | Germany . |
| 66 07 099 | 1/1997 | Germany . |

*Primary Examiner*—Rodney H. Bonck
*Assistant Examiner*—David M. Fenstermacher
*Attorney, Agent, or Firm*—Burns, Doane, Swecker & Mathis, L.L.P.

[57] ABSTRACT

An arresting screw is screwed into a transmission component so that a movable latch member of the arresting screw engages a gear shift selector to yieldably hold that selector in its respective positions. The arresting screw includes a core having screw threads, and a recess in which the latch member can slide. The threads and a surface of the recess are formed of metal. A plastic body is molded onto the core to close one end of the recess and to form a hexagonal head for receiving a tool. An electric switch can be integrated with the arresting screw for being actuated by the latch member. A housing of the switch is connected to the core by means of the plastic body. The plastic body can be molded onto the core and switch housing simultaneously or successively during the manufacturing process.

18 Claims, 4 Drawing Sheets

ARRESTING SCREW FOR VEHICLE TRANSMISSIONS

RELATED INVENTION

This invention is related to that disclosed in the inventor's concurrently filed application Ser. No. 08/616,889, entitled "Latch Element with Integrated Switch," the disclosure of which is incorporated herein by reference.

BACKGROUND

The subject of the invention is an arresting screw for vehicle transmissions in the form of a hollow bolt with a head and a thread piece which can be screwed into a gear unit. A latch link is movably mounted in the hollow bolt and is prestressed against a gearshift pattern of the selector shaft of the transmission. In addition the invention involves a method for the manufacture of such an arresting screw.

Arresting screws as described above are used to yieldably maintain the selector shaft in the transmission position which the driver has selected.

In a customary arresting screw described in DE 36 39 120 C2, the latch link has a ball which is located in a bearing shell and is maintained by means of smaller bearing balls at the end of a sleeve which can move in an axial direction. An antifriction bearing mounts the sleeve inside the hollow bolt so that it can move in the axial direction of the hollow bolt with low friction. The main body of this arresting screw is a precisely worked tuned part. In order to be able to form a hexagonal head which makes it possible to screw the arresting screw into the gear unit by means of a hand tool, the turned part must be manufactured from a hexagon shaped blank in a relatively labor extensive manner.

DE 38 08 375 C1 corresponding to U.S. Pat. No. 4,941,368 describes how a frame type sheet metal part is pressed into the hollow bolt to provide a hardened bearing surface for the roll barrels of the antifriction bearing and at the same time acts as an abutment for a spring which prestresses the sleeve toward the selector shaft. In that case an additional step is needed to manufacture and press in the frame-type sheet metal pan.

In order to have a simplified manufacturing process it would be desirable to manufacture the hollow bolt from plastic material by means of a transfer molding process. However, in that case the screw thread connection between the hollow bolt and the gear unit in the area of the thread piece is susceptible to loosening in the long run due to the creep behavior of plastics.

The goal of the invention therefore is to design an arresting screw as described in the introduction which can be permanently attached to the gear unit and which can nonetheless be manufactured in a simple manner.

SUMMARY OF THE INVENTION

The object of the invention is attained in that the head of the hollow bolt has a plastic body which is injection molded onto a hollow, cylinder shaped metal core which provides the thread piece and the guide for the latch link.

This means that the hollow, cylinder shaped metal core can be made by turning a cylinder shaped metal blank which reduces the manufacturing process considerably. For example, the hexagon shaped part which is needed as a tool-receiving part for screwing the arresting screw into the gear unit is produced in a simple manner by subsequently injection-molding the plastic material onto the metal core. This means that the screw-thread part still is comprised of metal so that it is possible to ensure a durable fit of the arresting screw in the gear unit. The guide for the latch link, i.e., the bearing surface for the antifriction bearing in which the sleeve with the latch ball is located, is formed by the metal core and thus is highly resistant to wear. That resistance can be increased by hardening the metal surface. This means that the process in accordance with the invention no longer requires that an additional sheet metal piece be pressed into the hollow bolt especially since the abutment for the spring can also be formed by the head of the molded-on plastic body.

The surfaces of the metal core on which plastic material is molded preferably have a relief, for example a knurl or a pattern of grooves and ribs which improve the adherence of the metal to the plastic material. A sealing lip can be extruded directly on the side of the plastic body which faces the thread part of the arresting screw, with the sealing lip fitting snugly against the metal of the gear unit when the arresting screw is tightened, thus providing a reliable seal between the thread bore and the gear unit.

The plastic body can also have a number of gripper fingers which are distributed along the inside circumference of the hollow, cylinder-shaped metal core and which extend axially through the inside of the metal core in the areas between the bearing surfaces of the roll barrels. Those fingers form spring gripper claws which prevent the sleeve of the antifriction bearing from falling out of the hollow bolt.

DE 43 07 596 A1 describes how an arresting screw is combined with an electric switch which is to be actuated by the latch link, thus making it possible to sense when the reverse gear is engaged in order to turn on the back-up lights of the vehicle. In such a combination of arresting screw and switch, the plastic body which is molded onto the metal core in accordance with the invention can simultaneously form a switch housing or can help connect the switch housing mechanically with the actual arresting screw.

This could be accomplished by maintaining the switch housing and the metal core in the desired position relative to each other and then injection molding the plastic material around them. An alternative is for the arresting screw to form a recess which encloses the end of the switch housing while forming an annular gap therebetween. Alternatively, the switch housing can form a recess which encloses the respective end of the arresting screw while forming such a gap. In both of the above cases, the gap would be filled with plastic material. In that case the plastic material body can be considered as having been formed by the plastic material injected into the space. Of course the arresting screw can have a metal core and a molded-on plastic body which makes up the hexagon insert bit and, if necessary, the recess for the switch housing.

An arresting screw which is combined with a switch usually has a flexible membrane between the switch housing and the end of the hollow bolt which faces it. The invention makes it possible to securely attach this membrane in a simple manner and to seal it, by embedding its circumference is embedded in the molded plastic body.

DESCRIPTION OF THE DRAWING

The following paragraphs describe preferred exemplary embodiments of the invention with the help of the drawings.

DETAILED DESCRIPTION OF PREFERRED EMBODIMENTS OF THE INVENTION

Figure 1:
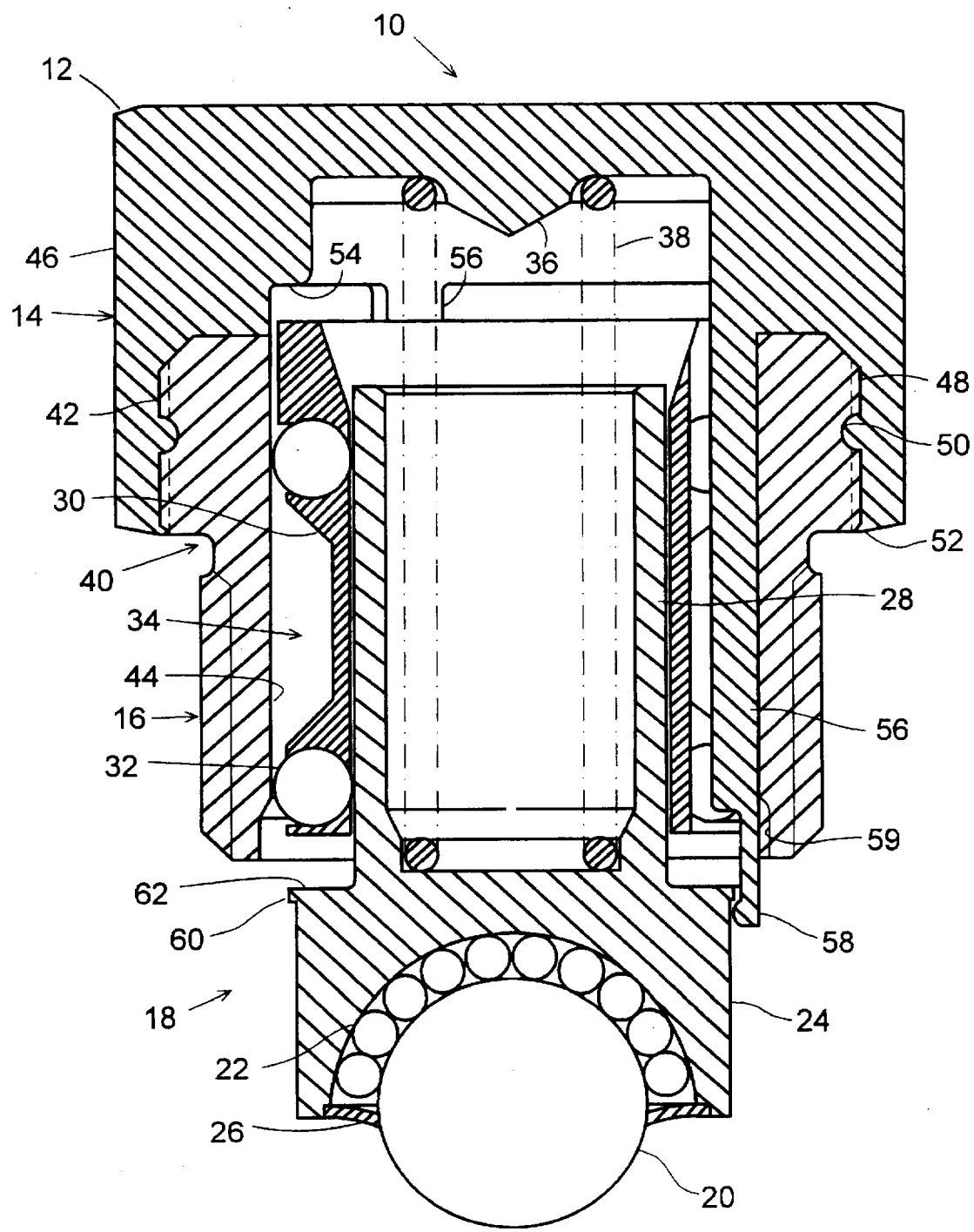
FIG. 1 shows an axial section through a first embodiment of an arresting screw according to the invention.

The arresting screw 10 shown in FIG. 1 has a housing in the form of a hollow bolt 12 having a polygonal (preferably hexagon shaped) head 14, for example, and a thread piece 16 which has an outside thread adapted to be screwed into the thread bore of a transmission casing which is not shown. Inside the hollow bolt there is a latch link 18 including a latch ball 20 which traverses the gearshift pattern of a selector shaft of the transmission which is not shown. The latch ball 20 is located in a bearing shell 24 by means of support balls 22 in a low-friction manner and is secured by a retaining ring 26.

The latch link 18 forms a cylinder shaped sleeve 28 which is of one piece construction with the bearing shell 24 and is located in a ball bearing 34 comprised of a ball bearing retainer cage 30 and balls 32. The sleeve 28 can move axially within a limited range inside the hollow bolt 12. The head 14 of the hollow bolt has a top inner surface which forms an abutment 36 acting as a centering cone for the inner end of a helical spring 38, with the lower end of the spring resting against the bearing shell 24 and thus prestressing the latch ball 20 against the selector shaft.

The hollow bolt 12 has a hollow, cylinder shaped metal core 40 which forms the thread part 16 as well as a cylindrical section 42 with a somewhat larger diameter inside the head 14. The inside surface 44 of the metal core 40 can optionally be hardened and forms a bearing surface for the balls 32 of the ball bearing 34. This means it serves as the guide for the latch link 18.

Onto the cylindrical section 42 of the metal core 40 there is injection molded a plastic body 46 which forms the hexagon insert bit of the head 14 as well as the abutment 36. A solid, positive connection between the plastic body 46 and the metal core 40 is achieved by providing a knurl 48 and a circumferential groove 50 on the outside circumferential surface of the cylindrical section 42 of the metal core to receive the plastic material of the head 14.

There is a circumferential sealing lip 52 at the lower face surface of the plastic body 46 which overlies a shoulder of the core 40 and fits snugly (sealingly) against the outer wall of the transmission casing when the arresting screw 10 is screwed into and tightened in the transmission casing.

On the inside of the hollow bolt 12 the plastic body 46 forms a shoulder 54 which acts as a stop for the ball bearing retainer 30. From this shoulder 54, gripper fingers 56, which are an integral part of the plastic body 46, run axially through the inside of the metal core 40 to its lower end. The gripper fingers 56 are distributed in the circumferential direction so that they each extend into a circumferential gap between axial rows of the balls 32, the gaps defined by longitudinal grooves of the ball bearing retainer 30. At its free lower end each gripper finger 56 forms a gripper claw 58 which encloses a collar 60 of the bearing shell 24 and thus prevents the latch link 18 from falling out of the hollow bolt 12. The bore of the metal core 40 is somewhat widened at 59 at its lower end so that the gripper claws 58 can move elastically radially to the outside when the latch link 18 is latched into the gripper claws 58 during installation.

The upper end of the latch link 18 is defined by a shoulder 62 formed on the bearing shell 24. The shoulder 62 is able to make contact with the lower end of the ball bearing retainer when the retainer 30 is in its upper position in contact with the shoulder 54.

Figure 2:
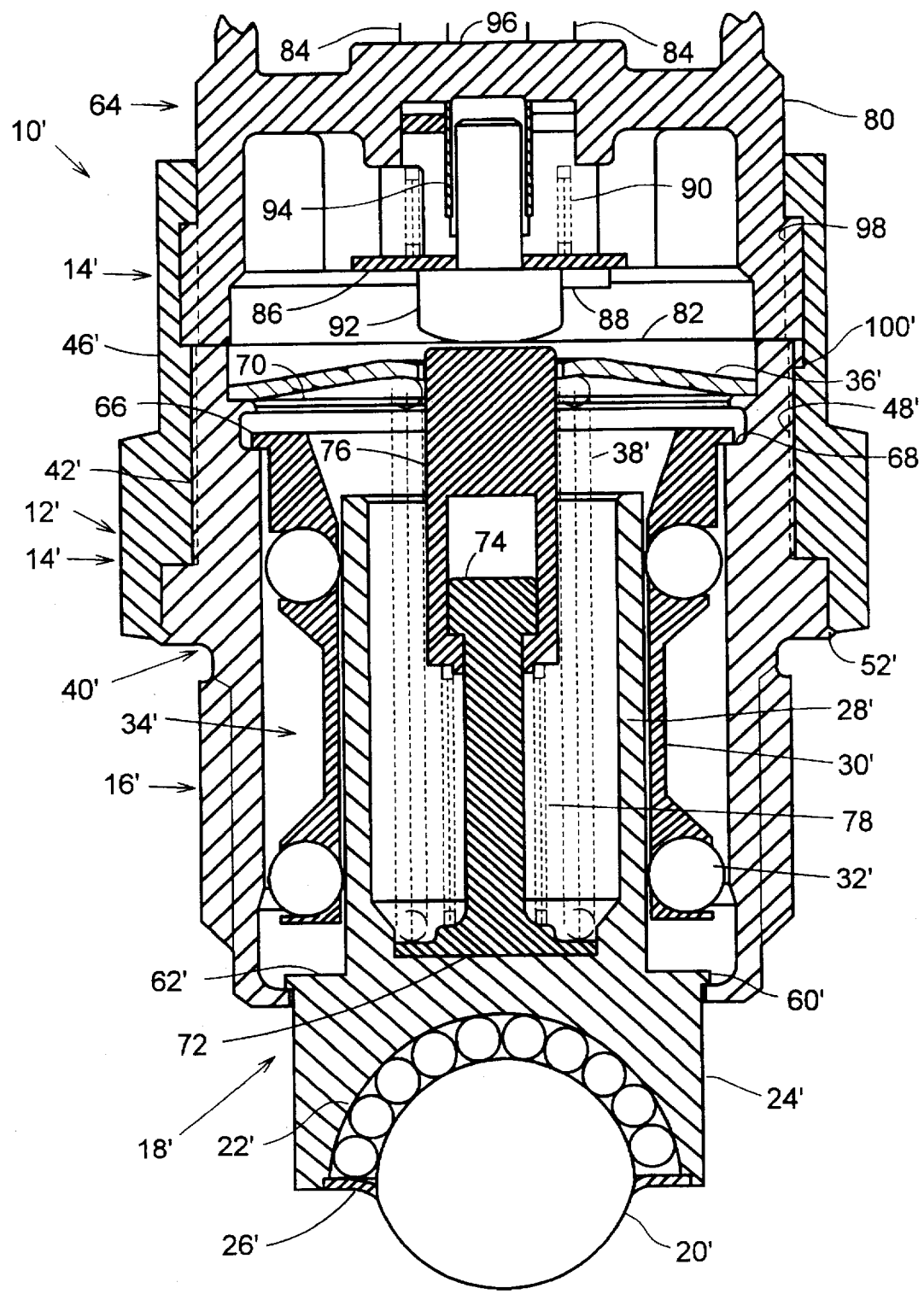
FIG. 2 shows a cross-section through an arresting screw in accordance with a second embodiment of the invention wherein the arresting screw is combined with a back-up light switch.

FIG. 2 shows a second embodiment in which an electric switch 64, for example a back-up light switch, is integrated with the head 14' of an arresting screw 10', with the switch being actuated by the latch link 18'.

The abutment 36' for the spring 38' in this case is a small annular plastic plate which is mounted at the upper end of the hollow, cylinder shaped body of the metal core 40'. The ball bearing retainer 30' has a collar 66 at its upper end which is mobile between a shoulder 68 and a collar 70 which protrudes to the inside of the metal core 40' so that the axial play of the ball bearing retainer is limited.

Here the lower end of the spring 38' rests against a retaining pin 72 which in turn rests on the lower end of the sleeve 28' which is closed by the bearing shell 24'. The upper end of the retaining pin 72 has a thick head 74 and is guided telescopingly within a pressure pin 76. In its center area the pin 72 is enclosed by another spring 78 whose lower end rests against the plate-shaped lower end of the retaining pin and whose upper end pushes the pressure pin 76 against the head 74. The retaining pin 72, the pressure ring 76 and the spring 78 together form a telescope like travel adjustment element which can be compressed elastically and which is used to actuate the switch 64. This travel adjustment 72, 76, 78 is the subject of the above-identified concurrently filed application Ser. No. 08/616,889.

The switch 64 (only the portion of the switch that accommodates the switch contacts being depicted in the drawing) mainly is comprised of a cylinder shaped plastic housing 80 disposed on the upper end of the metal core 40'. Between the housing 80 and the metal core 40' there is a membrane 82 comprised of a small, thin metal plate whose outer edge protrudes slightly past the circumference of the metal core 40' and the housing 80 as can be seen on the left side of FIG. 2. The membrane 82 separates the inside of the switch housing from the hollow bolt 12 to prevent oil from entering the switch 64 so that the electric components of the switch are protected.

Two contact pins 84 are located inside the housing 80 of the switch 64. These contact pins 84 form two electrical contacts 88 on the lower side of a contact bridge 86. Only the contact 88 of the right contact pin 84 is visible in FIG. 2.

The contact bridge 86 is prestressed in an elastic manner toward the membrane 82 by means of a spring 90. The bridge 86 rests against a head of an actuating mechanism 92 which can move axially in a sleeve 94 in the housing 80 and which is situated opposite the face of the pressure pin 76 located on the other side of the membrane 82. The range of movement of the actuating mechanism 92 is limited upward by means of a separating wall 96 of the housing 80 which forms a stop for the shaft of the actuating mechanism which is guided in the sleeve 94.

When the position of the transmission is changed and the latch ball 20' makes contact with a peak of the gearshift pattern on the selector shaft, then the latch link 18' as a whole is pushed back against the force of the spring 38' into the hollow bolt 12'. The force of the spring 78 overcomes the force of the spring 90 plus the restoring force of the membrane 82 so that the pressure ring 76 deforms the membrane and pushes the actuating mechanism 92 upward. This lifts the contact bridge from the electrical contacts 88 so that the switch 64 is opened. This is how it is possible, for example, to indicate that the selector shaft has left the reverse gear position. If the latch ball 20' continues to make contact with the peak of the gearshift pattern while the actuating mechanism 92 is in contact with the stop comprised of the separating wall 96, then the retaining pin 72 is pushed further into the pressure ring 76 against the force of the spring 78.

In the exemplary embodiment the plastic body 46' is molded on not only the upper cylindrical section 42' of the metal core 40' but also on the housing 80 of the switch 64. This mechanically joins the switch 64 to the hollow bolt 12' so they can constitute one unit. The protruding outer edge of the membrane 82 becomes embedded in the plastic body 46' so that the membrane is securely held in position and at the same time provides an effective seal between the inside of the hollow bolt 12' and the inside of the switch housing 80. Similar to the cylindrical section 42' of the metal core 40' the outside circumference of the switch housing 80 has knurls or grooves 98.

In order to be able to fix the switch housing 80 with regard to the metal core 40' during the manufacture of the plastic body 46' the circumference of the switch housing 80 has protruding cogs 100, which extend through slots (not shown) formed around the edge of the membrane 82 and which cogs enclose the outside circumference of the metal core 40'.

The arresting screw of FIG. 2 also includes a ball bearing 34' having balls 32', thread 16', shoulder 62' support balls 22', retaining ring 26', collar 60', stealing lip 52', and knurl 48' which function similar to corresponding elements of the FIG. 1 arresting screw.

The arresting screw shown in FIG. 2 is manufactured by first combining the metal core 40' and the switch housing 80 provisionally and by then injection molding the uniform plastic body 46' around them to form a head. That plastic head is shaped to form a hexagon tool-receiving member.

Figure 3A:
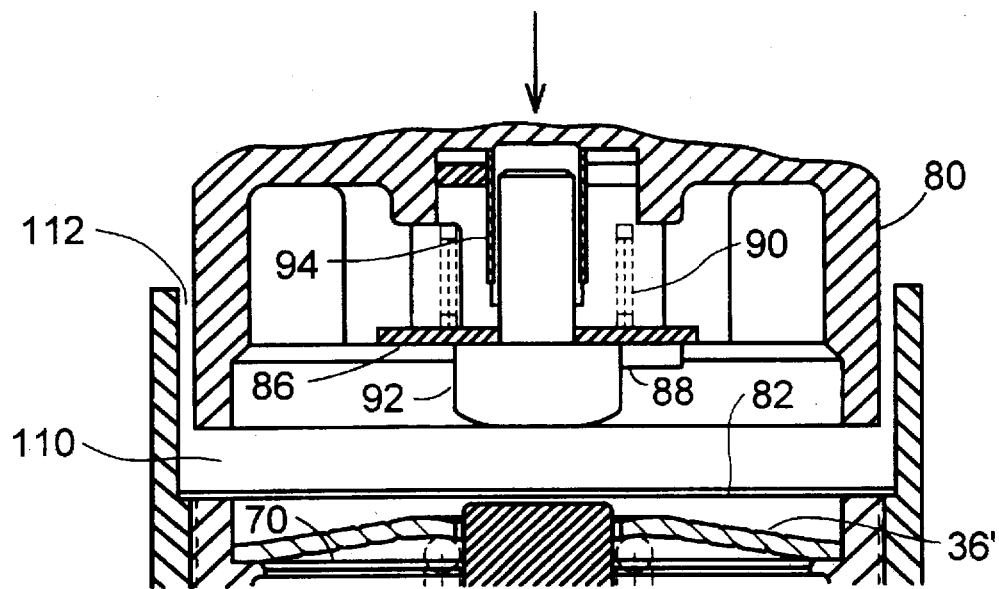
FIGS. 3A and 3B are fragmentary sectional views showing steps involved in one manufacturing method according to the invention.
Figure 3B:
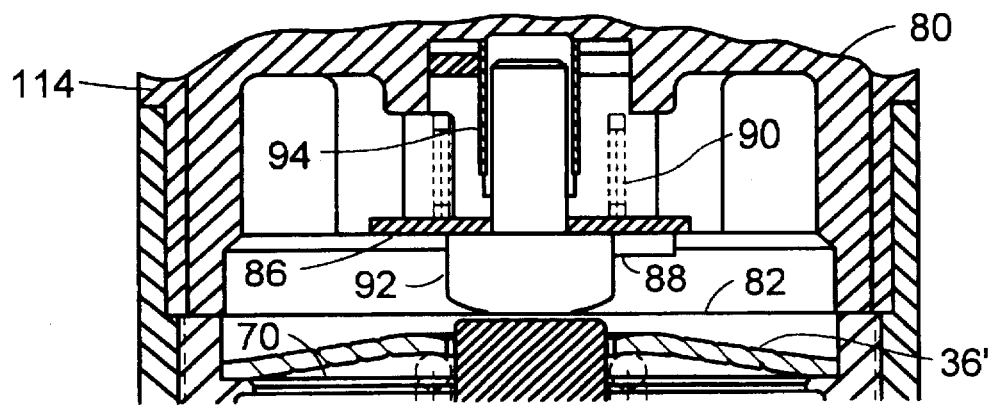

An alternative method, shown in FIGS. 3A and 3B, is to have a two-step program in which first the plastic body is molded onto the core 40 to form the hexagon member and at the same time to form a cylindrical recess 110 in the face of the head into which the lower end of the switch housing 80 can be inserted so that there is an annular gap 112 between the switch housing and the inside wall of this recess. This gap then is injection molded with plastic material 114 in a second manufacturing step (FIG. 3B).

In an analogous manner this is also possible if the hexagon tool-receiving member of the hollow bolt 12' is made completely from metal, i.e., is not formed by the plastic body 46'. In that case the plastic body would only have one function, i.e., to connect the switch housing 80 mechanically with the hollow bolt and to fix and seal the membrane 82.

Figure 4A:
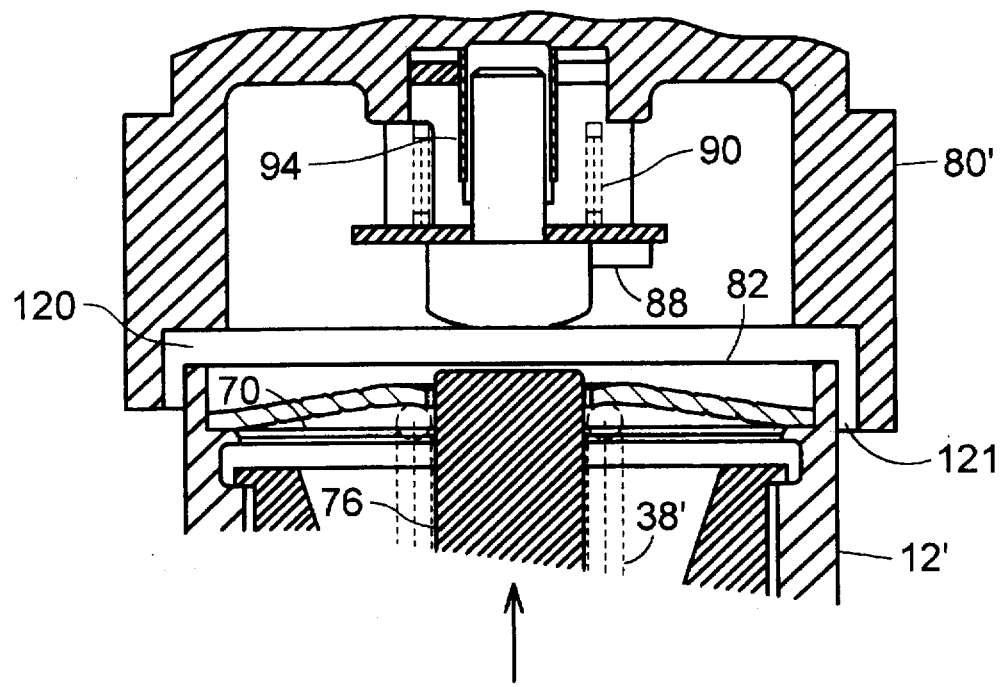
FIGS. 4A and 4B are fragmentary sectional views showing steps involved in another manufacturing method according to the invention.
Figure 4B:
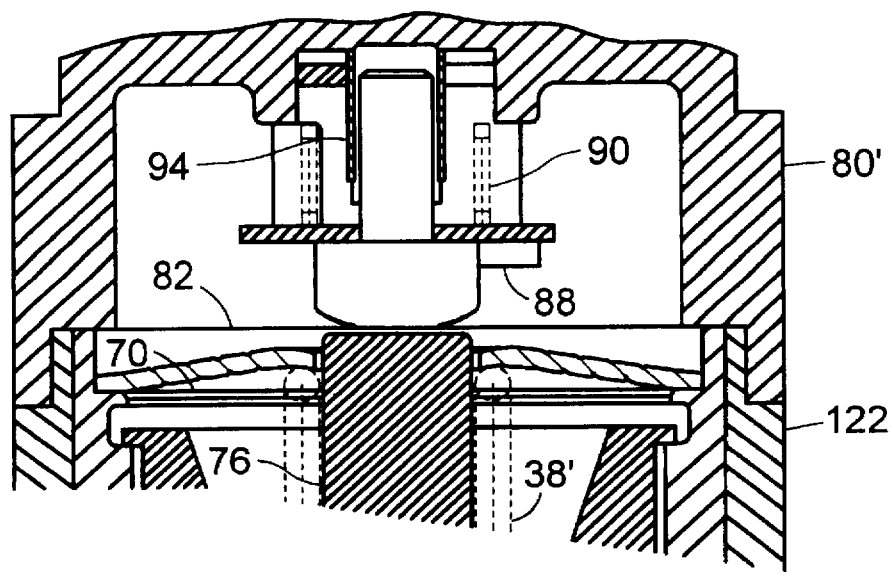

Reversely, as shown in FIGS. 4A, 4B it would also be possible for the switch housing 80' to have a recess 120 into which an upper end area of the hollow bolt 12' is inserted and which forms a gap 121 that is injection molded with plastic material 122 (FIG. 4B).

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. An arresting screw for a vehicle transmission, comprising: p1 a hollow bolt including a head and a metal core element affixed to the head, the core element including:

a metal screw thread adapted to be threaded into a transmission component, and a longitudinal recess extending generally coaxially with respect to the screw thread, the longitudinal recess being open at one longitudinal end thereof, the longitudinal recess including a metal guide surface;

a latch member mounted in the longitudinal recess for longitudinal sliding movement along the metal guide surface thereof, an end of the latch member protruding from the open end of the longitudinal recess and adapted to be yieldably biased against a gear selector shaft of the vehicle transmission for being longitudinally displaced in response to movement of the gear selector shaft; and a plastic body molded onto the core and defining the head, the head including a polygonal outer periphery exposed for receiving a turning tool, one of the plastic head and core element including recesses, portions of the other of the plastic head and core element projecting into the recesses to enhance the connection therebetween.

2. The arresting screw according to claim 1 wherein the core includes the recesses.

3. The arresting screw according to claim 2 wherein the recesses include knurls.

4. The arresting screw according to claim 3 wherein the recesses include grooves.

5. The arresting screw according to claim 2 wherein the recesses include grooves.

6. The arresting according to claim 1 wherein the core element includes a shoulder facing in the same logitudinal direction as the open end of the longitudinal recess, the plastic body including a sealing tip overlaying the shoulder to be pressed sealingly against the transmission element when the screw is screwed thereinto.

7. The arresting screw according to claim 1 wherein a portion of the plastic body closes a longitudinal end of the longitudinal recess disposed opposite the open end thereof.

8. The arresting screw according to claim 7 further including a spring disposed in the longitudinal recess for prestressing the latch member, one end of the spring bearing against an abutment defined by the portion of the plastic body which closes the longitudinal recess.

9. The arresting screw according to claim 1 wherein the plastic body includes a plurality of gripper fingers projecting longitudinally from the head and extending through the longitudinal recess, free ends of the gripper fingers forming claws for limiting the extent of longitudinally outward movement of the latch.

10. The arresting screw according to claim 9 further including a hollow ball cage disposed in the longitudinal recess, and a plurality of longitudinal rows of balls mounted in the cage for rolling movement along the metal guide surface, the latch member extending into the ball cage and engaging the balls; the gripping fingers disposed between successive rows of balls.

11. The arresting screw according to claim 1, further including an electric switch connected to the hollow bolt to be actuated in response to movement of the latch link, the switch including a housing connected to the plastic body.

12. The arresting screw according to claim 11, further including a membrane separating the housing from the latch, an outer peripheral portion of the membrane being embedded in the plastic body.

13. In a method of making an arresting screw for a vehicle transmission, the arresting screw comprising:

a hollow bolt including a head and a metal core element affixed to the head, the core element including:

a metal screw thread adapted to be threaded into a transmission component, and a longitudinal recess extending generally coaxially with respect to the screw thread, the longitudinal recess being open at one longitudinal end thereof, the longitudinal recess including a metal guide surface;

a latch member mounted in the longitudinal recess for longitudinal sliding movement along the metal guide surface thereof, an end of the latch member protruding from the open end of the longitudinal recess and adapted to be yieldably biased against a gear selector shaft of the vehicle transmission for being longitudinally displaced in response to movement of the gear selector shaft; and an electrical switch including a housing connected to the hollow bolt, the switch being actuated in response to a movement of the latch member;

the improvement wherein the arresting screw is connected to the housing by a step of molding plastic head onto the core and the housing, so that the plastic head forms a polygonal outer periphery exposed to receive a turning tool, one of the head and core including recesses, and portions of the other of the head and core projecting into the recesses to enhance the connection therebetween.

14. The method according to claim 13 wherein the longitudinal recess in the core constitutes a first recess; the housing forming a second recess; the method comprising inserting the core into the second recess, and molding the plastic material onto the housing and the core.

15. The method according to claim 13 wherein the molding step comprises molding the plastic material simultaneously onto the core and the housing.

16. The method according to claim 13 wherein the longitudinal recess in the core element constitutes a first recess; the method comprising molding a first amount of plastic material onto one of the core and housing to form a second recess, inserting the other of the core and housing into the second recess, and molding a second amount of plastic material onto the first amount of plastic material and to the other of the core and housing.

17. The method according to claim 16 wherein the inserting step includes inserting the other of the core and housing into the second recess to leave a gap between a wall of the second recess and the other of the core and housing; and molding the second amount of plastic material into the gap.

18. The method according to claim 17 wherein the first amount of plastic material is molded onto the core.

* * * * *